United States Patent [19]

Poulson

[11] 4,066,311
[45] Jan. 3, 1978

[54] MULTIPLE GUN CATHODE RAY TUBE TESTING, CLEANING, AND REJUVENATING APPARATUS

[75] Inventor: Daniel A. Poulson, Stevensville, Mich.

[73] Assignee: Heath Company, Benton Harbor, Mich.

[21] Appl. No.: 770,429

[22] Filed: Feb. 22, 1977

[51] Int. Cl.² .............................................. H01J 9/50
[52] U.S. Cl. .................................. 316/28; 324/20 CR
[58] Field of Search ................. 316/2, 28; 324/20 CR

[56] References Cited

U.S. PATENT DOCUMENTS 3,641,391   2/1972   Badewitz ............................... 316/28

Primary Examiner—Richard B. Lazarus
Attorney, Agent, or Firm—W. R. Sherman; K. McMahon; J. J. Kaliko

[57] ABSTRACT

Apparatus for testing, cleaning, and rejuvenating three gun, color television, cathode ray picture tubes is disclosed. The apparatus shown permits the cleaning and rejuvenating procedures to be performed separately and on selected, individual ones of the cathode ray tube guns so that these procedures need be carried out only on those guns actually requiring them. The apparatus includes a great deal of flexibility and, in particular, its full capabilities may be used even with cathode ray tubes having the control grids of the separate guns connected together in parallel.

13 Claims, 1 Drawing Figure

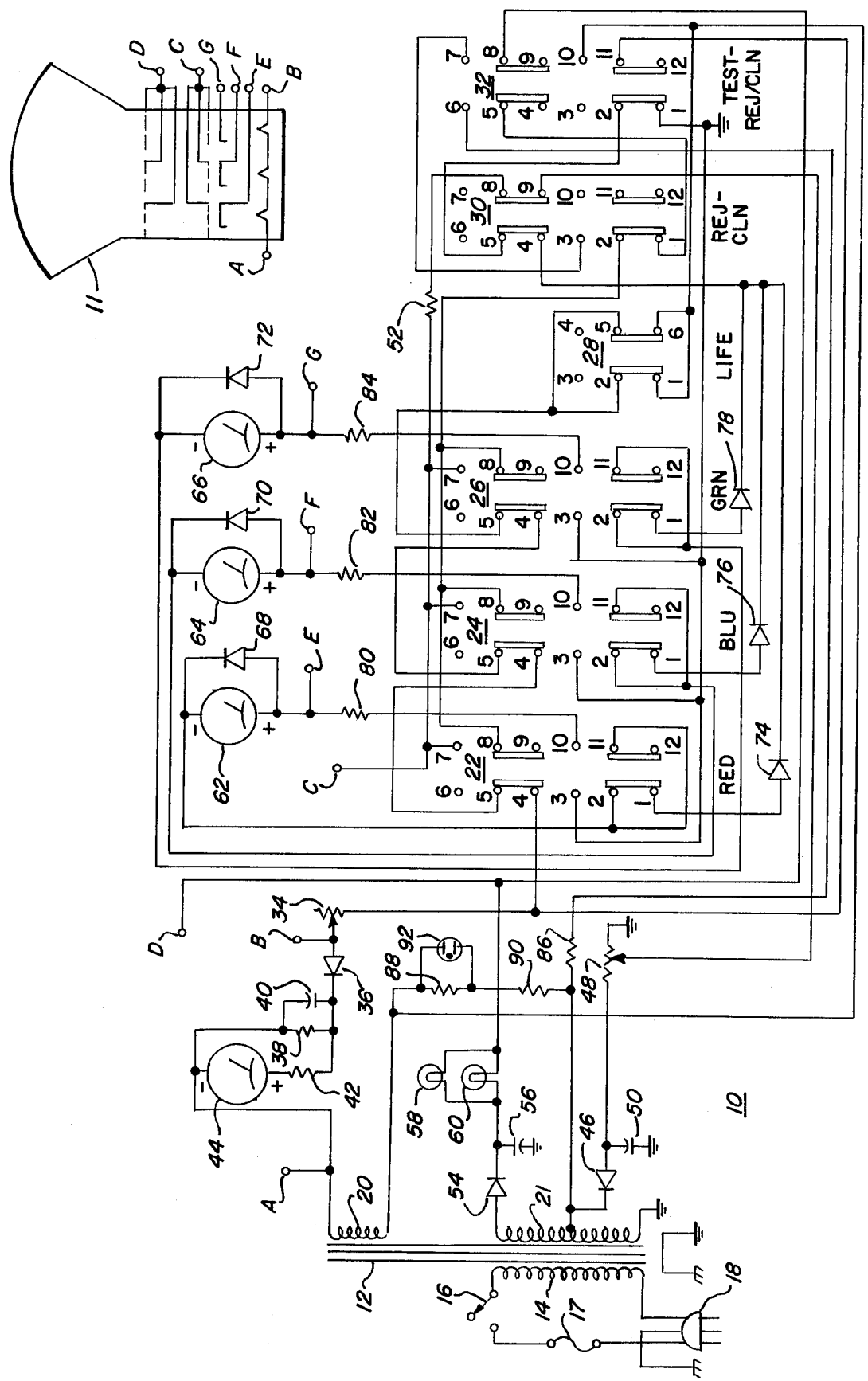

MULTIPLE GUN CATHODE RAY TUBE TESTING, CLEANING, AND REJUVENATING APPARATUS

BACKGROUND OF THE INVENTION

This invention relates to apparatus for restoring the cathode emission characteristics in cathode ray tubes having multiple guns and, in particular, relates to apparatus for testing, rejuvenating, and cleaning three gun, color television cathode ray picture tubes.

It is well known in the field of color television that after a picture tube has been used for an extended period of time, the rate at which electrons are emitted from the cathodes of one or more of the electron guns decreases sufficiently that the tube no longer produces an acceptable picture. The picture tube is, of course, one of the most expensive components in a color television receiver. The desirability of restoring the emission characteristics of the cathodes in color television picture tubes has been recognized in the past since such restoration would prolong the useful life of the picture tube. Various apparatus have been provided to perform this restoration; U.S. Pat. No. 3,641,391 to Albert R. Badewitz dated Feb. 8, 1972, and entitled "Device for Restoring Cathode Emission in Cathode-Ray Tube Guns," purports to described one such apparatus. In the restoration apparatus previously provided it has been known to provide circuitry for supplying a relatively high potential alternating voltage between the cathodes and the control grids of the cathode ray tube electron guns in order to effectuate a process referred to as "cleaning" the cathodes, and also circuitry for supplying a relatively high potential direct voltage between the cathode and the control grids of the cathode ray tube electron guns in order to effectuate a process referred to as "rejuvenating" the cathodes. The rejuvenation process is thought to result in the deposit of new emissive material on the electron emitting surfaces of the cathodes. However, the rejuvenation process may result in the cathode becoming polarized or the new emissive material being unevenly deposited across the emitting surface. The cleaning process is to cure these problems. Moreover, a certain amount of rejuvenation may also occur during the cleaning process. It is usually not desirable to clean or rejuvenate the cathode of an electron gun which does not require it as the application of high potentials across the cathode and control grid may on occasion cause permanent damage to the tube by, for example, shorting those elements together or partially destroying the layer of electron emitting material on the cathode. It has also been found desirable in the past to combine with apparatus for restoring cathode emission apparatus for testing the picture tube for the presence of defects in the tube other than low cathode emission rates.

However, the apparatus provided prior to this invention have had one or more of a number of drawbacks associated therewith. For example, in some such apparatus if one desired to clean or rejuvenate one of the electron guns in a multiple gun cathode ray tube, he had no choice but to perform the cleaning and/or rejuvenation process on all the electron guns simultaneously. In some such apparatus during the cleaning process, no indication was given to the operator of whether a short existed between the cathode and control grid of one or more of the guns. If such an indication were given during the cleaning process, the operator would then know that rejuvenation of the shorted gun or guns should not be attempted; this indication is particularly desirable where the potential used for rejuvenation is signficantly greater than that used for cleaning and/or the potential source used for rejuvenation is capable of delivering much higher currents than the source used for cleaning. Further, in apparatus available previous to this invention there was no circuitry for separately determining just which of the electron guns in a multiple gun cathode ray tube required cleaning or rejuvenation. In some apparatus having the circuitry just referred to, it way insufficiently versatile to be used with a wide range of types of cathode ray tubes and, in particular, could not be used with color television cathode ray picture tubes of the type known as "in-line" tubes and having the control grids of all three electron guns connected together in parallel. Further, prior restoration apparatus often did not provide circuitry for testing important parameters of the cathode ray tube and were often inconvenient or cumbersome to operate, some to the point of being dangerous.

SUMMARY OF THE INVENTION

Thus, there are provided by this invention apparatus for restoring the emission characteristics of multiple gun cathode ray tubes which may with ease and convenience to the operator be used to clean and/or rejuvenate individual electron guns on a selective basis. There are also provided by this invention apparatus for restoring the emission characteristics of multiple gun, color television cathode ray picture tubes which include circuitry for giving the operator an indication of just which guns need to be restored, which circuitry is sufficiently versatile that it can be used with a broad range of types of cathode ray tubes and, in particular, may be used with cathode ray picture tubes of the "in-line" type wherein the control grids of all the electron guns are connected together in parallel. Further, there are provided by this invention apparatus for cleaning and rejuvenating cathode ray tubes including circuitry for indicating to the user during the cleaning process whether a short circuit exists between the electron gun cathode and control grid.

Thus, it is an object of this invention to provide apparatus for restoring the cathode emission surfaces of multiple electron gun cathode ray tubes wherein the restoration operation may be performed on individual and selected ones of the electron guns.

It is an object of this invention to provide apparatus for restoring the cathode emission surfaces of multiple electron gun cathode ray tubes which include circuitry for indicating to the operator which electron guns require restoration and which is sufficiently versatile that the apparatus can be used with a broad range of cathode ray tube types.

It is an object of this invention to provide apparatus for cleaning and restoring the cathode emission surfaces of multiple electron gun cathode ray tubes including circuitry for indicating to the user during the cleaning process the existence for any shorts between the control grids and cathodes of the electron guns.

It is an object of this invention to provide apparatus for restoring the cathode ray tube emission surfaces of multiple gun cathode ray tubes which is extremely versatile, is convenient, easy, and safe to use, and is not unnecessarily expensive or complex.

Further and additional objects of this invention will be apparent from the subsequent description, the attached drawing, and the appended claims.

DESCRIPTION OF THE DRAWING

The single FIGURE of the drawing discloses an apparatus for testing, cleaning, and rejuvenating three gun, color television cathode ray picture tubes and how that apparatus is connected to such a cathode ray tube.

DESCRIPTION OF THE PREFERRED EMBODIMENT

A preferred testing, rejuvenating and cleaning apparatus 10 for use with three gun color television cathode ray picture tubes and embodying this invention is shown in schematic diagram form in the drawing. One such tube is shown at 11. As shown, it includes a single heater or filament for each of the three red, blue, and green electron guns, but each gun includes its own cathode, control grid, and accelerating or second grid. The circuitry of apparatus 10 will first be described in detail and its operation will then be explained.

The apparatus 10 includes a power transformer 12 having a primary winding 14 with one side thereof connected through the series combination of a power switch 16 and a fuse 17 to one terminal of a power plug 18 adapted for connection to a source of commonly available 110–120 volt alternating current. The other side of primary winding 14 is connected to a second terminal of plug 18. A first secondary winding 20 is provided in transformer 12 to supply a source of alternating voltage for application to the heater or filaments of the c.r.t. under test. A second secondary winding 21 is provided to supply the high voltages necessary for operation of the apparatus 10. Six pushbutton switches 22, 24, 26, 28, 30, and 32 are provided to control the various circuit functions of apparatus 10. Switches 22, 24, 26, 30, and 32 each includes two double pole, double throw sections ganged together for simultaneous operation, and switch 28 includes one double pole, double throw section. The switch terminals are numbered for ease of reference. Each of these six switches has a normal position as shown in the drawing but may also be placed in the other or actuated position. Switches 22, 24, and 26 are mechanically interlocked by means not shown so that only one of them may be actuated at a time, and they are further mechanically interlocked by means not shown with switch 28 so that actuation of switch 28 will return each of switches 22, 24, and 26 to its normal position. Switch 32 is spring loaded to its normal position so that manual pressure is required to maintain it in its actuated position. Switches 22, 24, 26, 28, 30, and 32 are labeled RED, BLU (Blue), GRN (Green), LIFE, REJ-CLN (Rejuvenate-Clean), and TEST-REJ/CLN (Test-Rejuvenate/Clean), respectively, in the drawing. As will subsequently become apparent, TEST-REJ/CLN switch 32 is effective to place apparatus 10 in a vest mode when it is in the normal position and in a rejuvenate/clean mode when it is in the actuated position; REJ-CLN switch 30 determines whether the apparatus 10 will perform the cleaning function (normal position) or the rejuvenating function (actuated position) when switch 32 is actuated; RED, BLU, and GRN switches 22, 24, and 26 are effective to select the red, blue, or green c.r.t. guns for the rejuvenating or cleaning function; and LIFE switch 28 is effective to perform a test when actuated which gives a qualitative indication of the remaining life of the c.r.t.

First and second terminals A and B are provided for connection to the terminals of the heater of the c.r.t. under test 11. (In the drawing the convention is assumed that like-lettered terminals are electrically connected together.) Terminal A is connected to a first side of secondary winding 20. Terminal B is connected through a rheostat 34 to terminal 4 of RED switch 22 and to terminal 11 of TEST-REJ/CLN switch 32. Terminal 5 of RED switch 22 is connected to terminal 4 of BLU switch 22, terminal 5 of BLU switch 24 is connected to terminal 4 of GRN switch 26, terminal 5 of GRN switch 26 is connected to both terminals 2 and 5 of LIFE switch 28, and terminals 1 and 6 of LIFE switch 28 are connected to both terminal 10 of TEST-REJ/CLN switch 32 and the second side of first secondary winding 20 of transformer 12. A circuit is provided for measuring the voltage across the heater of the c.r.t. under test. That circuit includes a rectifier having its anode connected to terminal B and its cathode coupled through the parallel combination of a resistor 38 and a filter capacitor 40 to terminal A. The series combination of a current limiting resistor 42 and a direct current reading meter 44 is coupled across resistor 38 and capacitor 40.

When apparatus 10 is connected to a c.r.t. and power is supplied to that apparatus and if switches 22, 24, 26, and 28 are in their normal positions as shown in the drawing, alternating current is supplied to the c.r.t. heater from secondary winding 20 through the described circuit including rheostat 34, the terminals 4 and 5 of switches 22, 24, and 26, and terminals 1, 2, 5, and 6 of switch 28. If either of those switches is actuated, that circuit is broken and power is no longer supplied to the heater therethrough. However, if TEST/REJ/CLN switch 32 is then actuated, power is again supplied to the heater through the circuit of rheostat 34 and terminals 10 and 11 of that switch. Meter 44 gives the operator of apparatus 10 a visual indication of the voltage across the c.r.t. heater. Diode 36 rectifies that voltage and filter capacitor 40 smoothes the resultant pulsating direct current so that direct current reading meter 44 may be used to give an indication of an alternating voltage.

Circuitry is additionally included in apparatus 10 for providing a negative voltage to the control grid of the c.r.t. A first side of secondary winding 21 of power transformer 12 is connected to circuit ground while a tap on that same winding is connected to the cathode of a diode 46 having its anode coupled to ground through the parallel combination of the resistance element of a potentiometer 48 and a capacitor 50. The wiper arm of potentiometer 48 is connected to terminal 9 of REJ-CLN switch 9. Terminal 8 of that same switch is coupled through a resistor 52 to terminal 7 on each of RED, BLU, and GRN switches 22, 24, and 26, and to terminal C arranged for connection to all the c.r.t. control grids. Rectifier 46 and filter capacitor 50 develop a direct current potential negative with respect to ground across potentiometer 48. When REJ-CLN switch 30 and RED, BLU, and GRN switches 22, 24, and 26 are in their normal positions, a negative potential from potentiometer 48 is applied to the c.r.t. control grids through the circuit including terminals 8 and 9 of that switch 30. The magnitude of the potential applied to the c.r.t. control grids may be adjusted by manual adjustment of potentiometer 48.

Secondary winding 21 of power transformer 12 is also used to provide a relatively high direct current potential to the second or accelerating grids of the c.r.t. under test. The second end of secondary winding 21 is connected to the anode of a diode 54 which has its cathode coupled first to ground through a filter capacitor 56 and second through the parallel combination of two incandescent indicator lamps 58 and 60 to terminal D. Terminal D is arranged for connection to the c.r.t. second or accelerator grids.

There is further provided circuitry in the cathode circuits of each of the three electron guns for separately measuring the current flows through the three guns. Terminals E, F, and G are arranged for connection to the cathodes of the red, blue, and green guns of the c.r.t., respectively. Terminal E is connected to the positive terminal of a direct current reading meter 62 having its negative terminal connected to terminals 2 and 11 of RED switch 22. Similarly, terminals E and F are individually connected to the positive terminals of direct current reading meters 64 and 66, respectively, the negative terminal of meter 64 being connected to terminals 2 and 11 of BLU switch 24 and the negative terminal of meter 66 being connected to terminals 2 and 11 of GRN switch 26. Diodes 68, 70, and 72 are separately placed across meters 62, 64, and 66, respectively, as shown with their anodes connected to the positive terminal of the respective meters. Each one of diodes 68, 70, and 72 protects its meter from excessive current flows therethrough by providing a very low impedance path in parallel with the meter when the voltage drop across the meter is sufficient to forward bias the diode. Terminal 1 of each of switches 22, 24, and 26 is separately connected to the anode of diode 74, 76, and 78, respectively, and the cathodes of each of those diodes are connected to terminal 4 of REJ/CLN switch 30. Terminal 5 of that switch is connected to terminal 2 of TEST-REJ/CLN switch 32 and terminal 1 of that latter switch is connected to ground. When switches 22, 24, 26, 30, and 32 are in the normal positions shown and sufficient potential is applied to the c.r.t. heater, an electron current tends to flow from ground through the circuit including terminals 1 and 2 of TEST/REJ/CLN switch 32, terminals 4 and 5 of REJ-CLN switch 30, diodes 74, 76, and 78, terminals 1 and 2 of RED, BLU and GRN switches 22, 24, and 26, and meters 62, 64, and 66 to the cathodes of the three c.r.t. guns and from there to the accelerating grids of the c.r.t. and through lamps 58 and 60 to the positive potential source present across capacitor 56. When either of switches 30 or 32 is actuated, this circuit is broken and current will not flow therethrough. The current through each of the c.r.t. red, blue, and green electron guns is separately indicated on meters 62, 64, and 66, respectively. Each of meters 62, 64, and 66 is connected in the cathode circuit of its corresponding electron gun and is capable of indicating the current flow through either the control grid to cathode circuit or the accelerator grid to cathode circuit of its corresponding electron gun.

In order to effect the rejuvenation operation, means are provided for supplying a relatively high positive potential to the c.r.t. control grids and permit current to flow in the control grid to cathode circuit of a selected one of the guns. Terminal 8 of TEST-REJ/CLN switch 32 is coupled through the previously mentioned parallel combination of lamps 58 and 60 to the high potential d.c. source present at capacitor 56. Terminal 7 of that same switch 32 is connected to terminal 3 of REJ-CLN switch 30. Terminal 2 of REJ-CLN switch 30 is connected to terminal 8 of each of RED, BLU, and GRN switches 22, 24, and 26. Thus, when REJ-CLN switch 30 is in the actuated position, one of the RED, BLU, or GRN switches 22, 24, or 26 is in the actuated position, and REJ/CLN switch 32 is depressed against the spring load to the actuated position, the potential across capacitor 56 will be applied to the control grids of each of the red, blue, and green control grids of the c.r.t. through the circuit including terminals 7 and 8 of TEST-REJ/CLN switch 32, terminals 2 and 3 of REJ-CLN switch 30, and terminals 7 and 8 of the actuated one of RED, BLU and GRN switches 22, 24, and 26. However, when REJ-CLN 30 switch is in the actuated position, the circuit coupling the c.r.t. cathodes to ground through the diodes 74, 76, and 78 is broken. A separate circuit is then provided for selectively coupling only one of the c.r.t. cathodes to ground. That circuit includes resistors 80, 82, and 84 separately connected from terminals E, F, and G, respectively, to terminals 10 of the respective ones of switches 22, 24, and 26. Terminal 3 of each of those switches is coupled to ground. Thus, when REJ-CLN switch 30 is actuated and one of switches 22, 24, or 26 is actuated to select the red, blue, or green guns, respectively, for rejuvenation, the cathode of that one selected gun is coupled to ground through a circuit including the corresponding one of resistors 80, 82, and 84 and terminals 10, 11, 2, and 3 of the corresponding one of RED, BLU, and GRN switches 22, 24, and 26. Moreover, the corresponding meter 62, 64, or 66 is effectively placed in parallel with one of resistors 80, 82, and 84 through the circuit of terminals 2 and 3 of the actuated one of switches 22, 24, and 26 so that the meter gives a reading proportional to the current flow in the cathode of the selected gun.

In order to effect the cleaning operation, means are provided for supplying an alternating potential to the c.r.t. control grids and permitting current to flow in the control grid to cathode circuit of a selected one of the guns. A resistor 86 is connected from the tap on the second secondary winding 21 of transformer 12 to terminal 6 of TEST-REJ/CLN switch 32. Terminal 5 of that switch is connected to terminal 1 of REJ-CLN switch 30. When REJ-CLN switch 30 is in the normal position, one of the RED, BLU, or GRN switches 22, 24, or 26 is in the actuated position, and REJ-CLN switch 32 is temporarily depressed against the spring load to the actuated position, the alternating potential at the tap of secondary winding 21 will be applied to each of the red, blue, and green control grids of the c.r.t through the circuit including terminals 5 and 6 of TEST-REJ/CLN switch 32, terminals 1 and 2 of REJ-CLN switch 30, and terminals 7 and 8 of the actuated one of RED, BLU, and GRN switches 22, 24, and 26. However, as long as REJ/CLN switch 32 is actuated, the circuit from the c.r.t. cathodes to ground through diodes 74, 76, and 78 is broken. As explained above with respect to the rejuvenation operation, only the cathode of the electron gun selected by actuation of one of the RED, BLU, or GRN switches 22, 24, or 26 is coupled to ground and the corresponding meter 62, 64, and 66 provides an indication of the current through that cathode.

Lastly, there is provided in apparatus 10 circuitry for indicating the presence of a short between the c.r.t. heater and any of the cathodes. This circuitry includes the series combination of two resistors 88 and 90 coupled between the second end of first secondary winding 20 on transformer 12 and the tap on second secondary winding 21. The resistance of resistor 88 is of much greater value than the resistance of resistor 90. A neon lamp 92 is connected in parallel across the resistor 88.

The operation of apparatus 10 will now be described with reference to operation of testing, rejuvenating, and cleaning a three-gun c.r.t. Some type of cable and socket arrangement (not shown) is provided to connect the c.r.t. 11 to apparatus 10 as is indicated in the drawing. As a first step, with no power applied to apparatus 10 rheostat 34 is adjusted to maximize its resistance and thus provide minimum voltage across the heater, potentiometer 48 is adjusted to provide a minimum negative voltage to the c.r.t. control grids (i.e., to reduce that voltage to ground potential), and each of switches 22, 24, 26, 28, 30, and 32 is placed in its normal position. The c.r.t. under test is then connected to apparatus 10, power switch 16 is closed to apply power to apparatus 10, potentiometer 48 is left as previously adjusted, and rheostat 34 is adjusted until the normal operating voltage for the heater of the c.r.t. under test is present across the heater. If a short circuit exists between the heater and any one of the cathodes, a current will flow through the circuit commencing at the tap on secondary winding 21 of power transformer 12 and including resistor 90, resistor 88, neon lamp 92, secondary winding 20, terminal A, the short between the heater and one or more of the c.r.t. cathodes, terminal E, F, or G, and the meter 62, 64, or 68 corresponding to the shorted cathode, terminals 1 and 2 of the corresponding one of RED, BLU, and GRN swtiches 22, 24, and 26, the corresponding one of diodes 74, 76, and 78, terminals 4 and 5 of REJ-CLN switch 30, terminals 1 and 2 of TEST-REJ/CLN switch 32, and the ground connection to the second end of secondary winding 21. If a sufficient amount of current flows through this circuit, neon lamp 92 will be lighted indicating that a heater to cathode short exists in at least one of the c.r.t. guns.

If a short exists between the heater and cathode of more than one of the c.r.t. guns, then the c.r.t. must be replaced. However, is such a short exists in only one of the guns, the c.r.t. need not be replaced but, instead, an isolation transformer may be placed in the circuit that supplies power to the c.r.t. heater in the television receiver using that c.r.t. according to techniques well known in the television service field. The circuit of apparatus 10 permits the operator to determine whether any heater to cathode short indicated on lamp 92 exists in one or more of the guns. Specifically, if lamp 92 lights indicating the presence of such a short, the operator may then adjust potentiometer 48 so that a maximum negative voltage is applied to each of the c.r.t. control grids. If a gun is not defective, this should result in no current flow in its accelerator grid to cathode circuit and there should be an indication of no current flow on the corresponding one of meters 62, 64, and 67. In the case of a defective gun, the current through the same path as was discussed above in relation to the ignition of neon lamp 92 will also flow through the corresponding one of meters 62, 64, and 66. Since that current will be rectified by the corresponding one of diodes 74, 76, or 78, it will result in a deflection of the meters 62, 64, or 66 and the deflection will be inversely proportional to the resistance of the short. Thus, the operator can determine which gun or guns are shorted merely by observing which ones of meters 62, 64, and 66 are deflected and can obtain a qualitative indication of the impedance of the short.

Assuming the lamp 92 does not light indicating no heater to cathode short exists, then the operator must check the readings on meters 62, 64, and 66. A current should be flowing in the accelerator grid to cathode circuit of each of the c.r.t. guns and, as previously explained, the current in each gun will flow through the respective one or meters 62, 64, and 66. If the reading on any of the meters is above a first predetermined level, this indicates that the emission rate of the cathode is acceptably high and the corresponding gun should not be either rejuvenated or cleaned. If the reading on any of those meters is below that same predetermined level, the emission rate of the cathode is unacceptably low and the corresponding gun should be cleaned and possibly also rejuvenated. To complete the initial testing procedure, potentiometer 48 is adjusted to provide the maximum negative voltage to the c.r.t. control grids. Each one of meters 62, 64, and 68 should indicate no current therethrough. If not, and in the absence of lamp 92 igniting, the c.r.t. is probably either gassy or has a defective control grid, and, if it is not providing acceptable performance, it must be replaced.

To clean a gun which requires it, the operator first places the corresponding one of RED, BLU, and GRN switches 22, 24, and 26 in the actuated position. This breaks the circuit for the heater voltage by removing the connection between terminals 4 and 5 of the switch 22, 24, or 25 that was actuated. REJ-CLN switch 30 is left in the normal position. The operator then depresses the TEST-REJ/CLN switch 32 which restores the heater voltage circuit through the connections between terminals 10 and 11 of switch 32. As previously mentioned, actuating switch 32 applies an alternating potential between the cathode and control grid of the gun being cleaned. the rheostat 34 is then adjusted to increase the heater voltage until the reading on the meter 62, 64, or 66 corresponding to the gun being cleaned is between the first predetermined level and a second predetermined level lower than the first predetermined level. (This may cause lamp 92 to light, but it may be ignored during the cleaning process.) The TEST-REJ/CLN switch 32 is maintained in its actuated position for approximately 15 seconds, rheostat 34 is then readjusted to return the heater voltage to its normal value, and the TEST-REJ/CLN switch 32 is released so that it returns to its normal position. The operations described in this paragraph are then repeated for each gun that requires cleaning. If following cleaning of any gun a full scale deflection of the corresponding meter 62, 64, or 66 does not result, that gun should be rejuvenated also.

According to one feature of this invention, meters 62, 64, and 68 are devices which provide differing indications dependent upon whether an alternating current or a direct current is passed through them. In particular, they are used to indicate whether a short circuit exists between the control grid and cathode of the gun being cleaned. An alternating current is applied between these elements during the cleaning step. If there is no short between the elements, the cathode and control grid will act as a rectifier so that a direct current will flow in the control grid to cathode circuit causing a visible, up scale deflection of the corresponding meter. If however, there is a short between these elements, an alternating current will flow between them. The alternating current will either cause no deflection in the corresponding meter or will cause it to vibrate about a zero reading with no up scale deflection. Thus observation of the meter during the cleaning step gives the operator a visual indication of the presence of a control grid to cathode short. If such a short exists, the gun cannot be cleaned and should not be rejuvenated.

It will be noted that a current limiting resistor 86 is included in the circuit supplying alternating current to the control grid for cleaning, but no such current limiter is provided in the circuit supplying direct current to the control grid for rejuvenating so that the maximum rejuvenation effect can be obtained. However, this means that if any attempt is made to rejuvenate an electron gun having a control grid to cathode short, excessive current will flow through both the apparatus 10 and the cathode ray tube. The use of meters 62, 64, and 66 to inform the operator which guns are shorted prevents this situation.

To rejuvenate any gun, the RED, BLU, or GRN switch 22, 24, or 26 corresponds to that gun is placed in the actuated position which, as above, removes the heater voltage. The REJ-CLEAN switch 30 is then placed in its actuated position and TEST-REJ/CLN switch 32 is depressed to place it in its actuated position which, as above, restores the heater voltage. As previously mentioned, this combination of switch positions applies a relatively high direct potential to the control grid corresponding to the actuated one of switches 22, 24, and 26. While switch 32 is depressed, rheostat 34 is adjusted until the reading on the corresponding one of meters 62, 64, and 68 is raised to a third predetermined level above the second predetermined level. (Lamp 92 may again light, but it may be ignored during rejuvenation also; lamp 92 should be extinguished when rejuvenation is complete.) As the rheostat is adjusted to increase the heater voltage, the current between the cathode and control grid increases causing lamps 58 and 60 to increase in brightness. To complete the rejuvenation, the rheostat 34 is first readjusted to lower the indication on the corresponding one of meters 62, 64, and 68 to a fourth predetermined level intermediate the first and third predetermined levels and then immediately readjusted again to return the meter indication up to the third predetermined level. This down and up readjustment procedure is repeated three times. If during rejuvenation lamps 58 and 60 flash on, this indicates that arcing between the cathode and control grid has occurred. The TEST-REJ/CLN switch 32 should be immediately released when this occurs and the operator should wait 10 seconds before the rejuvenation process is recommenced. The rejuvenation process is repeated for each gun that requires it. After a gun is rejuvenated, it should be cleaned again.

The apparatus 10 may also be used to obtain a quantitative measure of the life expectancy of the c.r.t. To perform this test, each of switches 22, 24, and 26 are placed in their normal position and potentiometer 48 is adjusted to minimize the negative potential applied to the c.r.t. control grids (i.e., to reduce that potential to ground). LIFE switch 28 is then placed in the actuated position which removes the power from the heater. With a good c.r.t., the currents through the accelerating grid to cathode circuits will be such that each of meters 62, 64, and 66 will be deflected full scale for 7 to 15 seconds after switch 28 is actuated.

In one embodiment of the apparatus 10, the components indicated below had the stated values:

| | |
|---|---|
| 34 | 25 ohms, 25 watts |
| 38 | 5.1 kohms, 0.5 watts, 5% |
| 40 | 10 μ fd., 50 volts |
| 42 | 18 kohms, 0.50 watts, 5% |
| 48 | 100 kohms, 0.5 watts |
| 50 | 10 μ fd., 350 volts |
| 52 | 100 kohms, 0.5 watts |

-continued

| | |
|---|---|
| 56 | 20 μ fd., 500 volts |
| 80, 82, 84 | 1 ohm, 2 watts, 10% |
| 86 | 1 kohm, 10 watts, 10% |
| 90 | 39 kohms, 0.5 watts, 10% |
| 36, 46, 54 | 1N2071 |
| 68, 70, 72 | 1N2071 |
| 74, 76, 78 | 1N2071 |

Meters 62, 64, and 68 provided full scale deflection at 100 milliamperes and the first through fourth predetermined levels corresponded to 50 ma, 30 ma, 85 ma, 60 ma, respectively. Approximately 390 volts with respect to circuit ground was present at the cathode of diode 54 and approximately −150 volts was present at the anode of diode 46.

It will thus be seen that apparatus for testing, cleaning, and rejuvenating of multiple gun cathode ray tubes having particular application to the performing of such operations on three gun, color television, cathode ray picture tubes has been provided which fulfills each of the above-mentioned objects of this invention. It will be apparent that the disclosed apparatus is also useful for testing, cleaning, and rejuvenating single gun or monochrome cathode ray tubes be merely using the portion of apparatus 10 associated with a single electron gun in the same manner as described for multiple guns. Moreover, it will be apparent that the apparatus 10 includes a switching network which gives it great flexibility of operation. For example, switches 22, 24, and 26 permit the operator to clean and rejuvenate individually selected ones of the three electron guns one at a time. Only the guns which actually require cleaning and rejuvenating need have the process performed on them, thus avoiding any unnecessary risk of damage to the guns from these processes. Further, switches 30 and 32 permit the operator to conveniently and safely select whether the apparatus is to perform the testing, rejuvenating, or cleaning function. Once the cathode ray tube 11 is coupled to apparatus 10, the operator need only manipulate switches in apparatus 10 to completely perform all three functions. Further, if during the rejuvenation operation any arcing should occur in the cathode ray tube 11 as indicated by a sudden increase in the brightness of lamps 58 and 60, the operator may terminate the rejuvenation operation easily, rapidly, and safely by releasing switch 32 and permitting it to return to its normal position. Finally, apparatus 10 is capable of being used as it stands without, for example, any extra adaptors or converters to perform the testing, cleaning, and rejuvenating operations on a wide variety of types of commonly used three gun, color television cathode ray picture tubes. The "in-line" tubes presently available commonly have the control grids of the three electron guns connected together in parallel internally of the tube envelope. In the use of apparatus 10, it is intended that all control grids in all the guns of the c.r.t. are connected together for connection to terminal C, so that the internal connection referred to in "in-line" tubes does not defeat or render inoperative the intended manner of operation of the apparatus 10. Moreover, since the meters 62, 64, and 66 and the switch elements used to select the individual guns are all located in the cathode circuit of the cathode ray tube guns rather than in the grid circuits, apparatus 10 is fully operative to perform all the testing, cleaning, and rejuvenating operations even on "in-line" tubes having their control grids internally connected together.

It will be apparent to those skilled in the art that the embodiment disclosed herein is subject to numerous modifications, alterations, and variations while still using the subject matter of this invention, and that the invention is not to be limited to that embodiment. It is contemplated, therefore, by the appended claims to cover any such modifications, alterations, and variations as fall within the true spirit and scope of this invention.

I claim:

1. Apparatus for restoring electron emission of the cathodes of multiple electron gun cathode ray tubes, said tubes having a heater and each electron gun having a cathode and a control grid, said apparatus having means for connection to the cathode ray tube being restored and comprising:
a potential source of supplying power to said heater;
an alternating current power source;
a direct current power source;
current flow indicating means for connection in the cathode to control grid circuits of said electron guns; and
switching network means coupled to said alternating current power source and said direct current power source and having a first switch configuration for coupling said direct current power source across the control grid and cathode of one of said electron guns and rejuvenating the cathode of that one electron gun and a second switch configuration for coupling said alternating current power source across the control grid and cathode of said one of said electron guns and cleaning the cathode of that one electron gun and further comprising a plurality of switch elements for selecting said one of said electron guns.

2. The apparatus of claim 1 wherein said switch elements are disposed for location in the cathode circuits of said cathode ray tube electron guns.

3. The apparatus of claim 2 further comprising a separate current flow indicating means for connection in the cathode circuit of each of said multiple electron guns.

4. Apparatus for restoring electron emission of the cathodes of multiple electron gun cathode ray tubes, said tubes having a heater and each electron gun having a cathode and a control grid, said apparatus having means for connection to the cathode ray tube being restored and comprising:
a potential source for supplying power to said heater;
an alternating current power source;
a direct current power source;
current flow indicating means for connection in the cathode circuits of said electron guns; and
switching network means coupled to said alternating current power source and said direct current power source and having a first switch configuration for coupling said direct current power source across the control grid and cathode of said electron guns and rejuvenating the cathodes of those electron guns and a second switch configuration for coupling said alternating current power source across the control grids and cathodes of said electron guns and cleaning the cathodes of those electron guns.

5. The apparatus of claim 4 wherein said switching network means further comprises a plurality of switch element means coupled to said alternating current power source and said direct current power source and having a number of switch configurations equal to at least the number of electron guns in said cathode ray tubes for enabling the coupling of said alternating current source and said direct current source across the cathode and control grid of only a selected one of said electron guns at a time.

6. The apparatus of claim 5 wherein said switch element means are disposed for connection in the cathode circuits of said electron guns.

7. The apparatus of claim 6 further comprising a separate current flow indicating means disposed for connection in the cathode circuit of each of said electron guns.

8. The apparatus of claim 7 wherein said current flow indicating means each comprises an electrical meter.

9. Apparatus for restoring electron emission of the cathodes of multiple electron gun cathode ray tubes, said tubes having a heater and each electron gun having a cathode and a control grid, said apparatus having means for connection to the cathode ray tube being restored and comprising:
a potential source for supplying power to said heater;
an alternating current power source;
a direct current power source;
current flow indicating means for connection in the cathode to control grid circuits of said electron guns and providing differential indications when direct or alternating current is being measured thereby; and
switching network means coupled to said alternating current power source and said direct current power source and having a first switch configuration for coupling said direct current power source across the control grid and cathode of a selected one of said electron guns and rejuvenating the cathode of that selected electron gun and a second switch configuration for coupling said alternating current power source across the control grid and cathode of a selected one of said electron guns and cleaning the cathode of that selected electron gun.

10. The apparatus of claim 9 wherein said current flow indicating means is further for connection in the cathode circuits of said electron guns.

11. The apparatus of claim 10 further comprising a separate current flow indicating means for connection in the cathode circuit of each of said electron guns.

12. The apparatus of claim 11 wherein said current flow indicating means each comprises an electrical meter.

13. Apparatus for testing, cleaning, and rejuvenating color television cathode ray picture tubes, said tubes having a heater and three electron guns with each electron gun having a cathode, a control grid, and a second grid, and said apparatus having means for connection to a cathode ray tube and comprising:
a potential source for supplying power to said heater;
an alternating current power source;
a direct current power source;
current measuring means for connection in the cathode circuits of said electron guns and providing differential indications when direct or alternating current is flowing in said cathode circuit, one such current measuring means being provided for each one of said three electron guns; and
switching network means coupled to said alternating current power source and said direct current power source and having a first switch configuration for coupling said direct current power source across the cathode and the second grid of said electron guns, a second switch configuration for coupling said direct current power source across the cathode and the control grid of one of said electron gun, and a third switch configuration for coupling said alternating current power source across the cathode and the control grid of said one electron gun, said switching network means further comprising a plurality of switch element means disposed for connection in the cathode circuits of said electron guns and coupled to said alternating current power source and said direct current power source and having at least three switch configurations, each of said three switch configurations enabling the coupling of said alternating current power source and said direct current power source across the cathode and control grid of only one of said electron guns.

* * * * *

UNITED STATES PATENT OFFICE
CERTIFICATE OF CORRECTION

Patent No. 4,066,311          Dated January 3, 1978

Inventor(s) Daniel A. Poulson

It is certified that error appears in the above-identified patent and that said Letters Patent are hereby corrected as shown below:

Column 2, line 9, "way" should read -- was --.

Column 3, line 55, "vest" should read -- test --.

Column 10, line 24, "be" should read -- by --.

Signed and Sealed this

Thirtieth Day of May 1978

[SEAL]

Attest:

RUTH C. MASON          LUTRELLE F. PARKER
Attesting Officer      Acting Commissioner of Patents and Trademarks